United States Patent [19]

Ito

[11] 4,431,897
[45] Feb. 14, 1984

[54] METHOD AND APPARATUS FOR DISCHARGE MACHINING

[75] Inventor: Tetsuro Ito, Aichi, Japan

[73] Assignee: Mitsubishi Denki Kabushiki Kaisha, Tokyo, Japan

[21] Appl. No.: 299,415

[22] Filed: Sep. 4, 1981

[30] Foreign Application Priority Data

Sep. 10, 1980 [JP] Japan ............................... 55-125799
Sep. 10, 1980 [JP] Japan ............................... 55-125800

[51] Int. Cl.³ ............................................... B23P 1/08
[52] U.S. Cl. .................................. 219/69 G; 219/69 M
[58] Field of Search ............... 219/69 S, 69 G, 69 M, 219/69 R, 68, 69 C, 69 E

[56] References Cited

U.S. PATENT DOCUMENTS

| | | | |
|---|---|---|---|
| 3,767,886 | 10/1973 | Sennowitz | 219/69 S |
| 3,825,713 | 7/1974 | Bell, Jr. | 219/69 S |
| 4,135,070 | 1/1979 | Pfau et al. | 219/69 G |
| 4,310,742 | 1/1982 | Pfau | 219/69 G |
| 4,365,300 | 12/1982 | Johanson et al. | 219/69 G |

Primary Examiner—M. H. Paschall
Attorney, Agent, or Firm—Sughrue, Mion, Zinn, Macpeak and Seas

[57] ABSTRACT

Discharge machining for machining a workpiece in a tapered configuration by applying electric current to the workpiece and the machining electrode, and moving the electrode relative to the workpiece in a main machining direction and also in a direction substantially perpendicular thereto. The electrode is initially advanced relative to the workpiece in the main machining direction to a predetermined position or depth. The electrode is then moved relative to the workpiece in a direction perpendicular to the main machining direction while retracting the electrode. When the machining gap is lowered, the electrode is moved toward the center of the circulating locus of the electrode, and thus a short-circuit between the electrode and the workpiece can be prevented.

7 Claims, 16 Drawing Figures

METHOD AND APPARATUS FOR DISCHARGE MACHINING

BACKGROUND OF THE INVENTION

The present invention relates to a method and apparatus for discharge machining in which a workpiece is machined obliquely or in a tapered shape by applying electric current to the workpiece and the machining electrode, and by moving the electrode relative to the workpiece in a main machining direction and also in a direction substantially perpendicular to the main machining direction.

In a conventional discharge machining method, a workpiece is machined to transfer the shape of the machining electrode into the workpiece while the electrode is only moved relative to the workpiece in a primary or main machining direction. Discharge machining utilizing the relative movement of the electrode relative to the workpiece in a plane perpendicular to the main machining direction is also known, as disclosed in Japanese Published Patent Application No. 3594/1966.

Figure 1:
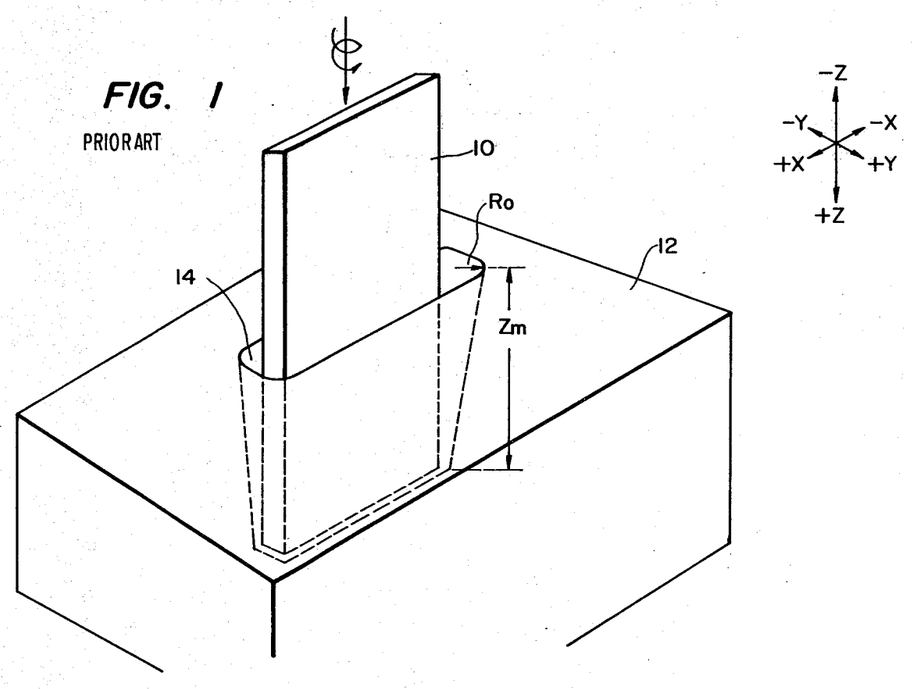
FIG. 1 is an explanatory diagram of tapered shape machining with an electrode in a conventional discharge machining method.

An example of the conventional discharge machining method will be described with reference to FIG. 1, in which a workpiece 12 is machined with an electrode 10 to a depth Zm in a tapered shape 14 having a radius $R_0$ (the length of movements of the electrode in a direction perpendicular to the main machining direction). At the time of starting the machining operation the length of displacement of the electrode is controlled in a direction perpendicular to the main machining direction in response to the depth of machining of the workpiece in such a manner to be larger at the time of starting the machining and smaller as the machining operation advances. More specifically, the electrode 10 is moved relative to the workpiece in a primary machining or Z-axis direction, and is also moved generally circularly in a plane substantially perpendicular to the Z-axis direction, or in X-axis and Y-axis directions. Thus, the electrode 10 is moved relative to the workpiece in a combination of these three axial directions, and the workpiece is thereby machined in the aforementioned tapered shape 14.

Figure 2:
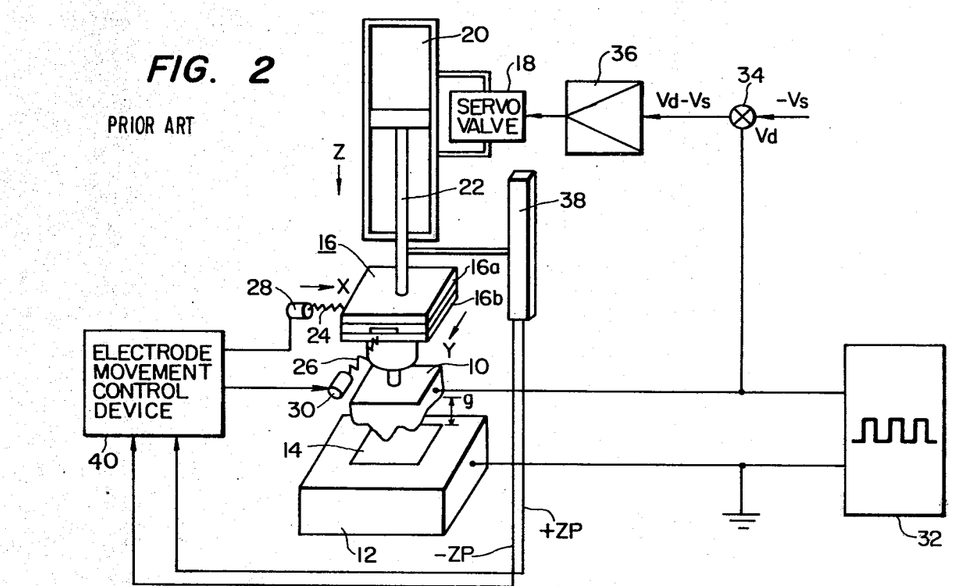
FIG. 2 is a schematic diagram showing a conventional discharge machining apparatus.

FIG. 2 shows an example of the discharge machining apparatus for practicing the above-described discharge machining method and machining the tapered shape 14 in the workpiece. In FIG. 2 an electrode 10 is mounted through a supporting base 16 at a hydraulic servo mechanism to move relative to a workpiece 12. The hydraulic servo mechanism includes a hydraulic servo valve 18 and a hydraulic cylinder 20. The electrode supporting base 16 is mounted at the end of the piston rod 22 of the hydraulic cylinder 20. The supporting base 16 includes a base 16X which moves in an X-axis direction and a base 16Y which moves in a Y-axis direction. Feeding nuts (not shown) are provided at the side surfaces of the respective bases 16X and 16Y. Feeding screws 24 and 26 are engaged with the nuts, respectively, and are rotationally driven by servo motors 28 and 30, respectively.

In operation, the electrode 10 is confronted with the workpiece 12 to be matched in a machining or insulating solution with a machining gap g formed therebetween. An electric discharge or an electrolysis occurs in the gap g between the electrode 10 and the workpiece 12. A pulse current supplied from a pulse current supply source 32 flows therebetween and the electrode 10 machines the workpiece 12 through the discharge or the electrolysis action.

At this time a voltage Vd corresponding to the machining gap g and a reference voltage Vs are applied to a voltage differential circuit 34, which produces an output Vd-Vs. This output is sequentially applied to an amplifier 36 and to the hydraulic servo valve 18, thereby controlling the servo valve in accordance with the amplified differential voltage. Thus, the hydraulic cylinder 20 is controlled by the servo valve 18, and in turn controls the electrode 10 mounted through the base 16 via the piston rod 22 until the voltage Vd coincides with the reference voltage Vs, and accordingly the electrode 10 is moved relative to the workpiece 12 in a main machining or Z-axis direction.

After the workpiece 12 is machined coarsely to the depth set slightly before the final desired depth by the electrode 10, and the coarse machining step is thus finished, the pulse current supply source 32 is switched to produce an output having smaller energy pulses. Further, a Z-axis digital pulse scale 38 for detecting the length of movement of the electrode 10 is the Z-axis direction is provided adjacent to the electrode 10 and produces an output signal to an electrode movement control device 40, which in turn produces output signals to both the servo motors 28 and 30. The servo motors move the electrode supporting base 16X in the X-axis direction and the electrode supporting base 16Y in the Y-axis direction, thereby imparting a circular motion of radius R to the electrode 10. In this manner the workpiece 12 is machined in a tapered shape 14 to a depth Z, with the radius R of the circle larger at the top and smaller at the bottom.

Figure 3:
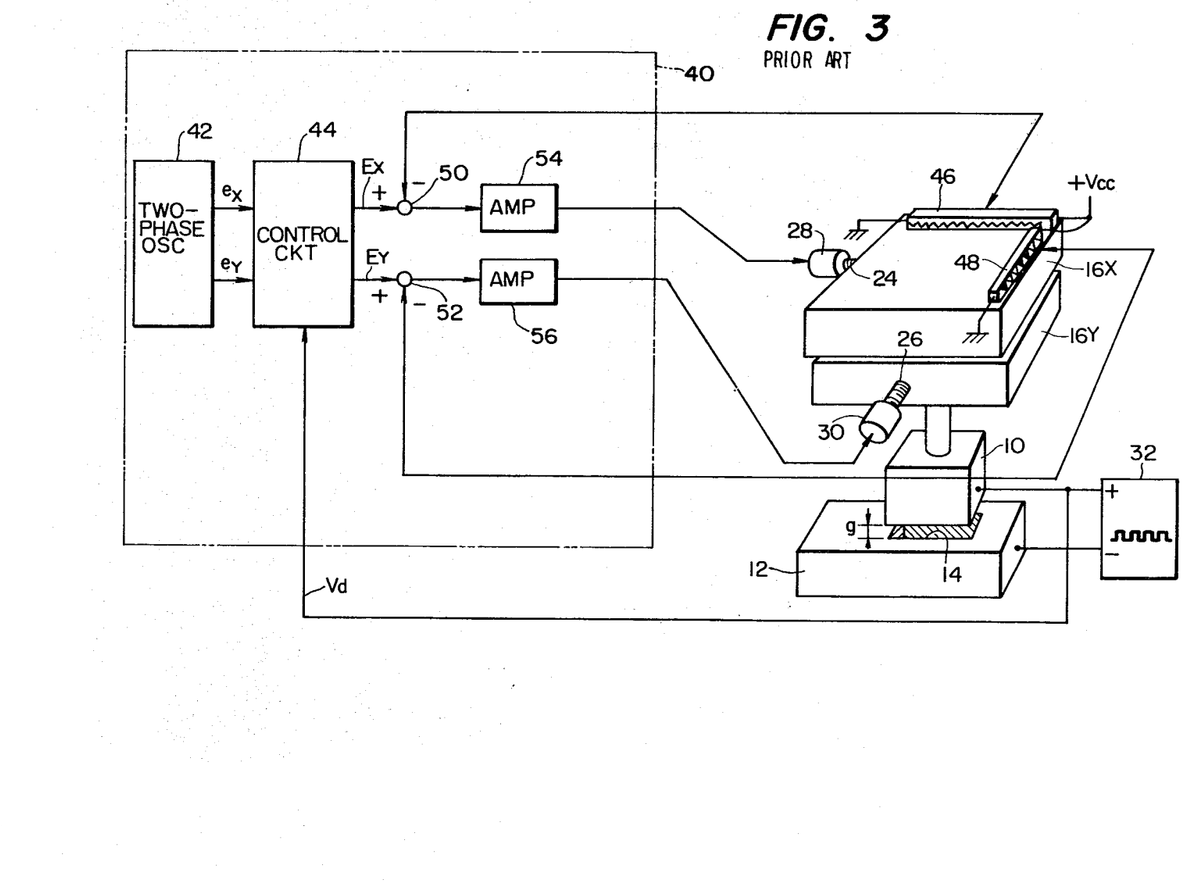
FIG. 3 is a block diagram showing the electrode movement control device employed in the apparatus shown in FIG. 2.

FIG. 3 shows an example of the electrode movement control device 40 in block diagram form, including a two-phase oscillator 42 for producing sine waves $e_x$ and $e_y$ differing in phase by 90°, a control circuit 44 for producing voltage outputs $E_x$ and $E_y$ corresponding to the desired eccentric radii under the control of the sine waves $e_x$ and $e_y$ on the basis of the voltage Vd corresponding to the machining gap, addition points 50 and 52 for adding the detected outputs $R_x$ and $R_y$ from linear potentiometers 46 and 48, respectively, corresponding the lengths of the X-axis and Y-axis movements of the electrode supporting base 16, and the output voltages $E_x$ and $E_y$ from the control circuit 44, and amplifiers 54 and 56 for amplifying the outputs from the addition points 50 and 52 and applying them to the servo motors 28 and 30, respectively. With this configuration of the control circuit 40, the servo motors 28 and 30 will operate until the output voltages from the addition points 50 and 52 become zero and accordingly control the movements of the electrode supporting bases 16X and 16Y so as to become equal to the outputs $E_x$ and $E_y$ from the control circuit 44.

Figure 4:
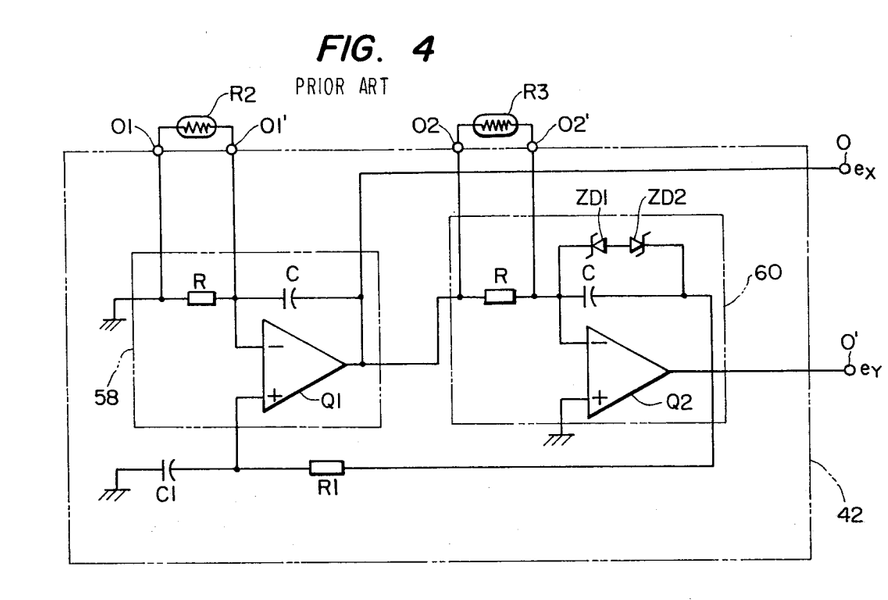
FIG. 4 is a circuit diagram showing the two-phase oscillator employed in the control device shown in FIG. 3.

FIG. 4 illustrates the two-phase oscillator 42 in the control circuit 40, including an integrating circuit 58 having an operational amplifier Q1, a resistor R connected between the inverting input terminal of the amplifier Q1 and ground, and a capacitor C connected between the output and the inverting input terminal of the amplifier Q1; a limiting inversion integrating circuit 60 having an operational amplifier Q2, a resistor R connected between the output of the operational amplifier Q1 and the inverting input terminal of the amplifier Q2, a capacitor C connected between the output and the inverting input terminal of the amplifier Q2, and voltage limiting zener diodes ZD1 and ZD2 connected in reverse series with one another and also connected in parallel with the capacitor C. The integrating circuit 58 is connected in cascade with the inversion integrating circuit 60 in a feedback loop described in the following differential equations:

$$RC(d/dt)e_x = e_y, \text{ and} \tag{1}$$

$$RC(d/dt)e_y = e_x, \tag{2}$$

where the time constants R1, C1 are intentionally made larger than RC to thereby render the circuit slightly unstable. The voltage limiting zener diodes ZD1 and ZD2 serve to eliminate the deformation of the waveform of $e_y$ and to stabilize the amplitude thereof. The two outputs $e_x$ and $e_y$ have different phases of 90° as will be expressed by the following equations:

$$e_x = E \sin(t/RC), \text{ and} \tag{3}$$

$$e_y = E \cos(t/RC), \tag{4}$$

where E represents the voltage at the zener diodes ZD1 and ZD2. External terminals 01 and 01', 02 and 02' are connected at both ends of the resistors R and R for setting the frequency in the integrating circuits 58 and 60, and external resistors R2 and R3 are respectively connected between such terminals. The output terminals 0 and 0' of the oscillator 42 are connected to the control circuit 44 as shown in FIG. 3.

Figure 5:
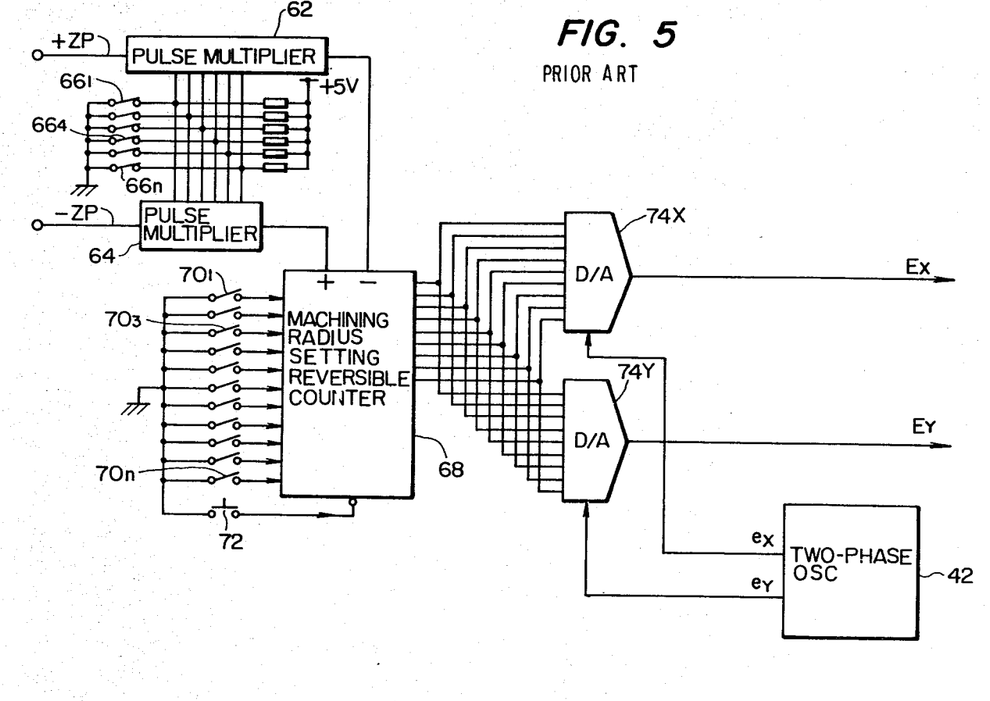
FIG. 5 is a circuit diagram showing the control circuit employed in the control device shown in FIG. 3.

FIG. 5 shows an example of the control circuit 44. Pulse signals +ZP and −ZP outputted from the Z scale 38 in response to the variations in the Z-axis movement of the electrode 10 are inputted to the control circuit 44. In this case, as the electrode 10 advances while machining the workpiece 12, the +ZP is outputted from the Z scale 38, and as the electrode 10 retracts the −ZP is outputted.

The pulse train thus outputted from the Z scale 38 are applied to the pulse multipliers 62 and 64, respectively. Such pulse multipliers are generally known as binary rate multipliers (BRMs), and TTL IC SN7497N circuits manufactured by Texas Instruments, Inc. may be utilized.

The pulse trains thus outputted from the Z scale 38 are demultiplied through the pulse multipliers 62 and 64 to a desired factor I/N preset by input switch groups $66_l$ through $66_n$ such that the setting of the machining radius R of the workpiece is varied by one unit for every N pulses due to the variation in the Z-axis movement of the electrode 10.

The outputs from the multipliers 62 and 64 are in turn applied to the negative and positive input terminals of a machining radius (R) setting reversible counters 68 set at the radius $R_0$ at the time of starting the machining operation. This initial value is executed by setting switch groups $70_l$ through $70_n$, and is set into the reversible counter 68 at the time of starting the machining operation by a set switch 72.

The outputs from the reversible counter 68 are applied to multiplication type digital-to-analog converters (DACs) $74_x$ and $74_y$, together with the outputs $e_x$ and $e_y$ from the two-phase oscillator 42. The outputs $E_x$ and $E_y$ from the converters $74_x$ and $74_y$ can be expressed as follows:

$$E_x = RV \sin \theta, \tag{5}$$

$$E_y = RV \cos \theta, \text{ and} \tag{6}$$

$$RV = 1/N\{\Sigma(-ZP) - \Sigma(+ZP)\}, \tag{7}$$

where RV represents the digital output of the reversible counter 68. The converters $74_x$ and $74_y$ may be model No. AD7520 manufactured by Analog Devices, Inc. (U.S.A.).

With the control circuit 44 thus constructed, the taper angle A machined into the workpiece 12 can be specified by the 1/Z setting of switch groups $66_l$ through $66_n$ for determining the distribution ratio of the machining radius R relative to the length of Z-axis movement of the electrode 10, and the switch groups $70_l$ through $70_n$ for determining the radius $R_0$ at the time of starting the machining operation, as follows:

$$A = \tan^{-1}(R_0/Zm), \text{ and} \tag{8}$$

$$Zm = R_0 \cdot N, \text{ whereby} \tag{9}$$

$$A = \tan^{-1}(1/N), \tag{10}$$

where assuming R = 0 when the machining depth Z is Zm, N represents the setting factor of the pulse multipliers 62 and 64, and Zm represents the final depth of the machining of the workpiece.

Figure 6A:
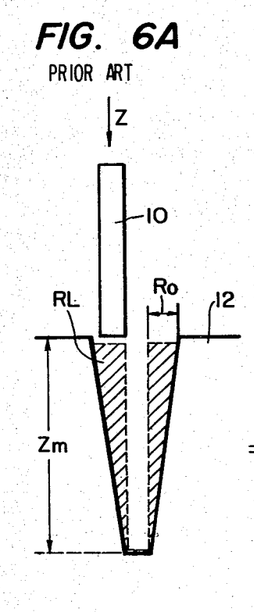
FIGS. 6A through 6C are explanatory diagrams showing taper machining with the apparatus shown in FIG. 2.
Figure 6B:
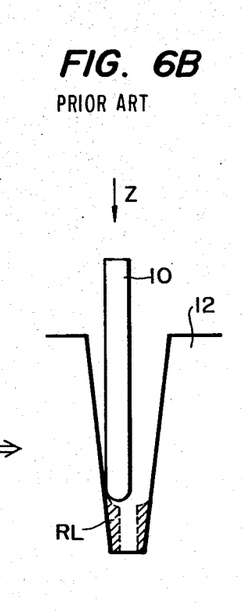
Figure 6C:
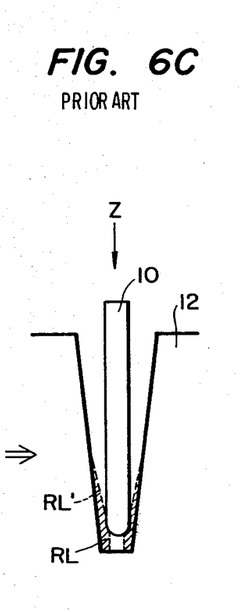

In the conventional discharge machining apparatus, the end of the electrode always confronts the workpiece 12 as indicated in FIG. 6A in the machining operation. Accordingly, the end of the electrode is always acted on by the discharge or the electrolysis and is thus readily consumed. When the electrode is so consumed, its end shape is varied as indicated in FIGS. 6B and 6C. Therefore, the margin RL of the portion hatched in the workpiece cannot be completely machined, but remains as indicated by the portion designated by broken lines RL' in FIG. 6C. Consequently, the configuration of the machined workpiece differs from the desired configuration, and the accuracy of the workpiece is degraded.

These problems are caused by the portion at which the electric discharge or electrolysis occurs being concentrated at the end of the electrode 10, and by the end of the electrode 10 being more consumed as compared with the other portion.

SUMMARY OF THE INVENTION

These problems are avoided in accordance with the method and apparatus of this invention by initially machining down to a predetermined depth in the Z-axis direction, and thereafter gradually withdrawing the electrode while simultaneously moving it in a generally circular manner in the X and Y-axes direction, i.e. in a plane perpendicular to the main machining direction. During such withdrawal the radius of the circular movement of the electrode is constantly increased in proportion to the degree of magnitude of withdrawal to thereby machine a tapered configuration in the workpiece. During the initial downward movement of the electrode along the Z-axis the machining is primarily implemented by the end or tip of the electrode, whereas during the withdrawal and circular movement of the electrode the machining is primarily implemented by the side or lateral surfaces thereof, thereby greatly reducing the extent of electrode wear or consumption.

If a shortcircuit occurs between the electrode and the workpiece during the withdrawal and circular movement, as detected by a sharp drop in the gap voltage, the electrode is quickly displaced towards the center of the locus of its circular movement, i.e. towards the Z-axis, to thereby break the shortcircuit and reestablish the desired machining gap.

DETAILED DESCRIPTION OF THE PREFERRED EMBODIMENTS

Figure 7A:
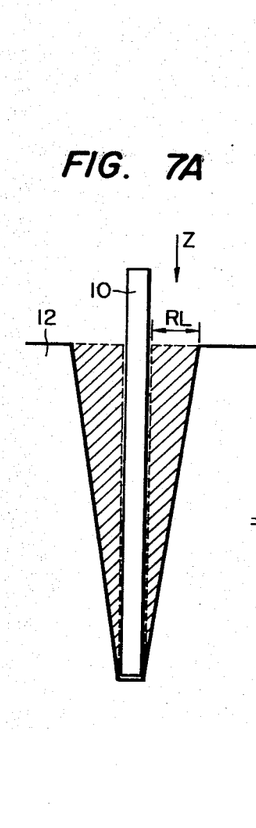
FIGS. 7A through 7C and 8A through 8C are explanatory diagrams showing tapered machining in accordance with the method of the present invention.
Figure 7B:
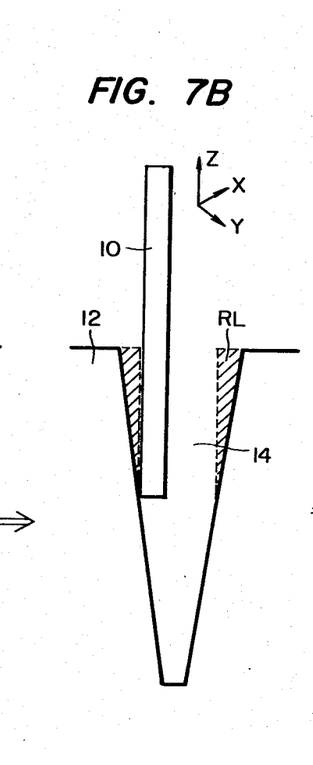
Figure 7C:
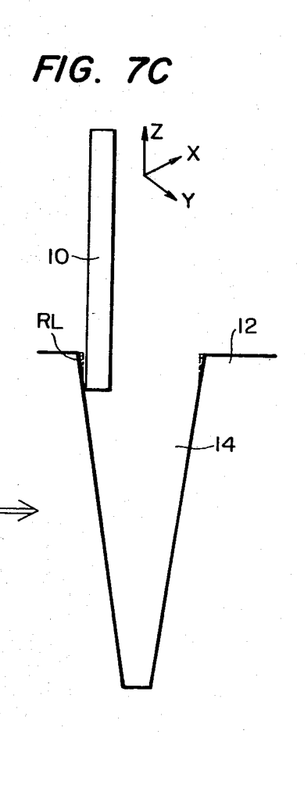

As shown in FIG. 7A, according to the present invention a machining electrode 10 is moved downwardly relative to a workpiece 12 to a predetermined position in a primary or Z-axis direction while machining the workpiece 12 with the end of the electrode. The electrode 10 is then moved upwardly from the finished position relative to the workpiece in a direction perpendicular to the main direction (in X-axis and Y-axis directions) as indicated in FIGS. 7B and 7C while machining the workpiece 12 with the side surface of the electrode.

With this method the workpiece 12 can be machined essentially by the side surface of the electrode 10 in the X-axis and Y-axis directions. Thus, such method can greatly reduce the local consumption of the electrode and can also precisely machine the workpiece in a tapered shape using a conventional machining electrode.

As a numerical example, the electrode consumption occurs in proportion to the amount of machining margin at a predetermined consumption ratio. For instance, when a workpiece is machined to a depth $Zm=100$ mm with machining margin $RL=1$ mm in a tapered shape, the electrode consumption ratio is 1%; $100$ mm$\times 0.01 = 1$ mm is consumed at the end of the electrode 10, while only $1$ mm$\times 0.01 \times \frac{1}{2} = 0.005$ mm is consumed at the side surface of the electrode 10. It is thus evident that the machining of the workpiece at the side of the electrode is much more advantageous in reducing the local electrode consumption. In the above equation, $\frac{1}{2}$ represents the average amount.

Figure 8A:
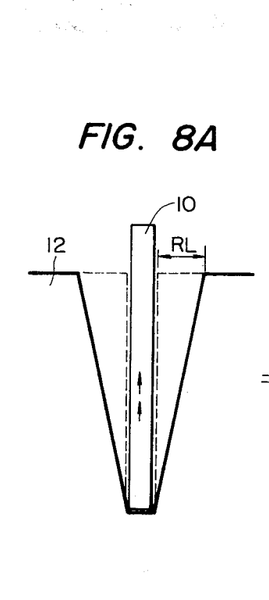
Figure 8B:
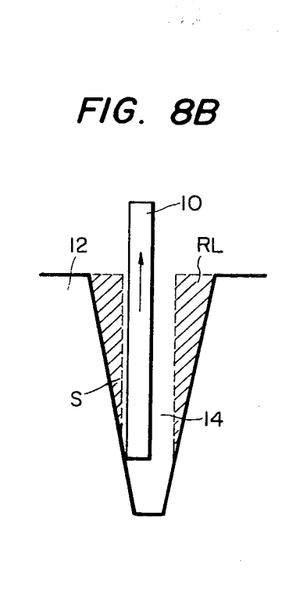
Figure 8C:
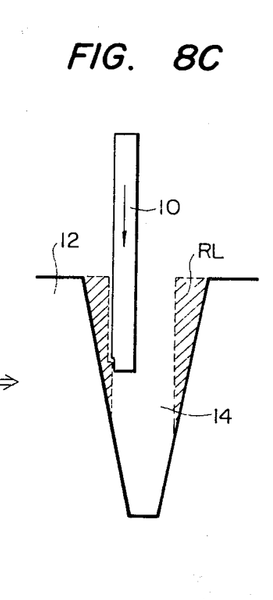

Although this discharge machining method has the advantage that the discharge or electrolysis does not concentrate at the end of the electrode, a shortcircuit S readily occurs between the electrode 10 and the workpiece 12 as indicated in FIG. 8B. If the electrode 10 is raised more than as required in the Z-axis direction, since the main machining direction of the electrode is also in the Z-axis direction, the end of the electrode 10 is sometimes abnormally consumed as indicated in FIG. 8C.

Figure 9:
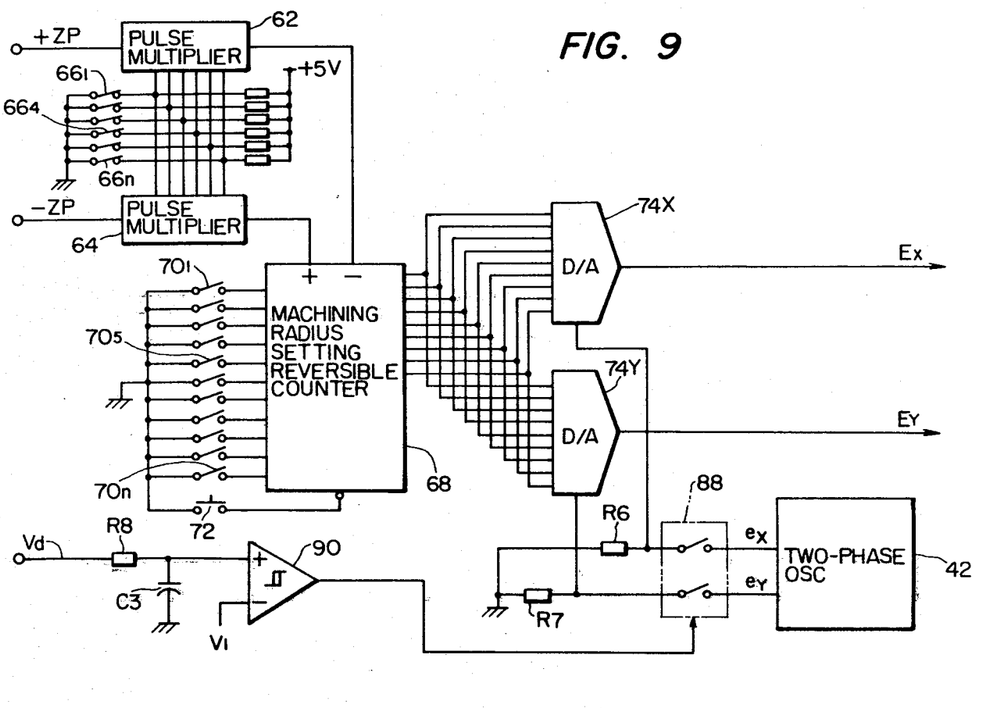
FIG. 9 is a circuit diagram showing a preferred embodiment of the control circuit employed in the apparatus of the invention.

Another embodiment of a discharge machining method for eliminating this drawback will be described with reference to FIG. 9, which shows an improved control circuit according to the invention to be employed in the apparatus, by revising the control circuit 44 shown in FIG. 5. In the apparatus of FIG. 9, the outputs of a circuit for imparting displacement vectors in X-axis and Y-axis directions, such as a two-phase oscillator 42, are turned on or off through an analog switch 88.

In the improved control circuit, resistors R6 and R7 are connected between the D/A converters 74X and 74Y and ground through side terminals of the analog switch 88. Accordingly, when the switch 88 is turned off, the outputs $e_x$ and $e_y$ from the two-phase oscillator 42 are disconnected from the inputs of the converters 74X and 74Y, and the resistors R6 and R7 are grounded. Consequently, the inputs to the converters 74X and 74Y become "0" volts irrespective of the magnitude of the digital input values thereto. Therefore, the outputs $E_x$ and $E_y$ of the converters become "0" volts, and the radius R becomes "0". In this circuit, the analog switch 88 is turned off when the output from a comparator 90 is zero, that is, the voltage Vd of the machining gap g is lower than a reference voltage $V_1$ while being higher than the time constant of the delay circuit containing a resistor R8 and a capacitor C3 connected to the non-inverting input of the comparator 90.

As described before, since the discharge machining method according to the invention machines the workpiece essentially at the side surface of the electrode in the X-axis and Y-axis directions, the local electrode consumption is smaller than the conventional discharge method for machining the workpiece essentially at the end of the electrode, and can machine the workpiece precisely in a tapered shape. Further, when a shortcircuit occurs between the electrode and the workpiece when machining in the X-axis and Y-axis directions, the shortcircuit can be eliminated by retarding the electrode toward the center of the machining locus in the X-axis and Y-axis directions so that the peripheral radius R becomes zero, thereby isolating the gap between the electrode and the workpiece.

If a hysteresis characteristic is incorporated in the comparator 90 in the control circuit shown in FIg. 9, even if the voltage Vd corresponding to the machining gap g is recovered by the elimination of the shortcircuit, since the peripheral radius R is temporarily maintained at zero and accordingly the electrode 10 is maintained at the central or starting position, the hunting of the electrode can be prevented.

Figure 10:
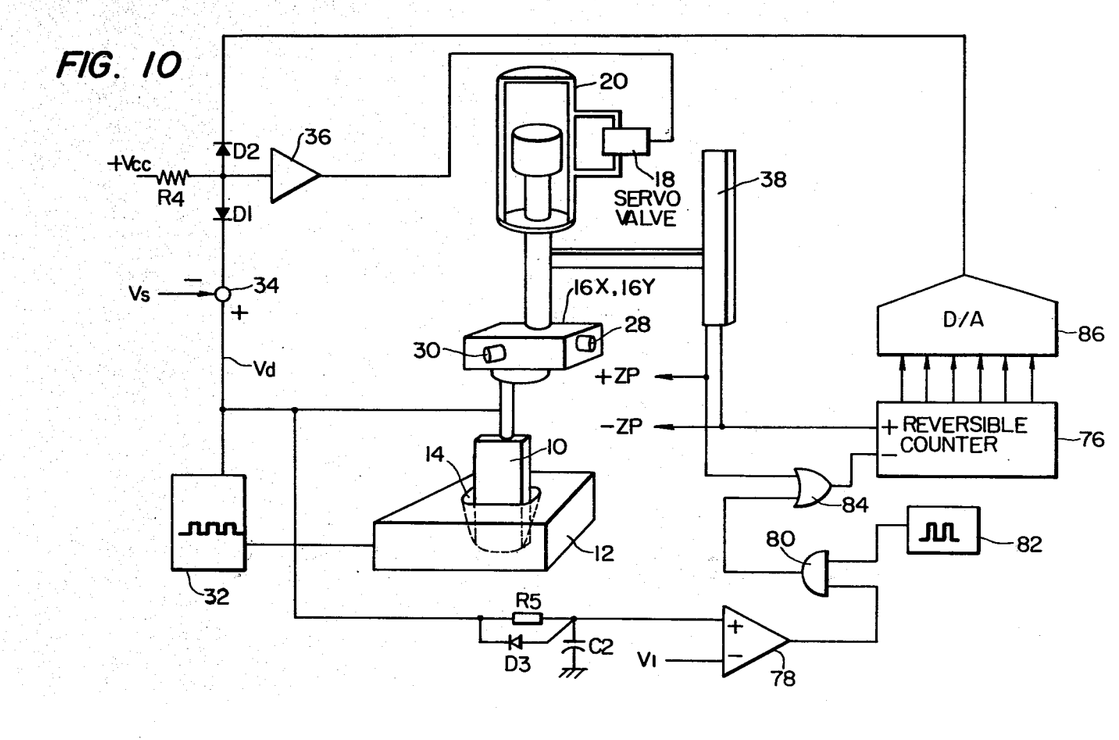
FIG. 10 is a schematic diagram showing the discharge machining apparatus of the invention.

Another embodiment of the invention will be described with reference to FIG. 10, in which the like reference numerals designate the same components shown in FIG. 2. The electrode movement control device 40 for moving the electrode 10 in the X-axis and Y-axis directions is constructed in the same manner as those shown in FIGS. 3, 4 and 9. In FIG. 10 an arrangement for suitably retracting the electrode 10 relative to the workpiece 12 in the Z-axis direction is shown. The position of the electrode 10 in the Z-axis direction can be monitored by counting the output pulses of the Z scale 38, but this embodiment is so constructed as to detect the position of the electrode in the Z-axis direction in combination with an interelectrode servo and a Z-axis position servo, and to machine the workpiece above the finishing position after the workpiece is completely machined to a predetermined depth.

That is, the output pulses $+ZP$ and $-ZP$ from the Z-scale 38 are counted by a reversible counter 76. When the workpiece 12 is machined to a predetermined depth Zm and the voltage Vd corresponding to the machining gap is raised higher than the reference voltage $V_1$ of a comparator 78, the comparator produces an output "1" which is in turn applied to one input terminal of an AND gate 80. This allows the AND gate to pass the output pulses from an oscillator 82 through an OR gate 84 to the inverting input of the reversible counter 76 to count down the counter. Even if the electrode 10 is moved downwardly in the Z-axis direction by the interelectrode servo so that pulses $+ZP$ are outputted from the Z-scale 38, the reversible counter 76 is counted down in this manner. Since the outputs from the counter 76 are applied as minus or negative voltages through the D/A converter 86 to a diode D2, even if the voltage Vd (interelectrode servo voltage) of the machining gap g is high and the output voltage of the voltage differential circuit (addition point 34) is plus or positive, the input voltage of the amplifier 36 becomes minus or negative by the operation of diodes D1 and D2, serving as a diode analog switch, and a resistor R4. Consequently, the electrode 10 may not be moved downwardly from its position in the Z-axis direction.

If a shortcircuit or the like occurs and the electrode 10 is thereby retracted from its position in the Z-axis direction, the output pulses $-ZP$ from the Z-scale 38 are added in the reversible counter 76, and the output from the D/A converter 86 becomes plus or positive. Since the voltage Vd corresponding to the machining gap is lower at this time, the electrode 10 is isolated from the workpiece to thus eliminate the shortcircuit.

Since a delay circuit having a resistor R5, a capacitor C2 and a diode D3 connected in parallel with the resistor are connected in the plus input circuit of the comparator 78, even if the voltage Vd corresponding to the machining gap g is high, the electrode 10 may not immediately be retracted backwardly in the Z-axis direction until the workpiece is sufficiently machined in the machining gap and the machining gap becomes open. When a shortcircuit occurs between the electrode 10 and the workpiece 12, the charged capacitor C2 is rapidly discharged through the diode D3, and the electrode 10 is thus not retracted excessively in the Z-axis direction.

It is evident that since in the discharge machining apparatus shown in FIG. 10 the workpiece can be machined by setting the radius $R_0$ at the position of finishing the machining operation in the Z-axis direction at the switch groups $70_l$ through $70_n$ shown in FIG. 5, a tapered shape of any width can be machined in the workpiece irrespective of the size of the electrode 10. Since the taper angle A of the workpiece can be obtained in accordance with equation (10), it can be independently set at the N setting switch groups $66_l$ through $66_n$.

It is noted that the foregoing description is directed to a control device employed in the discharge machining apparatus according to the invention in which the amount of machining in the X, Y and Z-axes directions can be set exclusively, but this can also be sufficiently carried out by using an NC equipment incorporating the interelectrode servo and the position servo switching function shown in FIG. 8.

The machining electrode 10 may be formed circular, triangular, square or any other arbitrary shape in cross section and in the same diameter along the entire length.

What is claimed is:

1. A discharge machining method for machining a workpiece by applying electric current to said workpiece and an electrode through a machining solution in a machining gap between said workpiece and said electrode, and by moving said electrode relative to said workpiece in a main machining direction and in a direction perpendicular to the main machining direction, comprising the ordered steps of:
   (a) initially displacing said electrode downwardly relative to said workpiece in the main machining direction to a predetermined depth while machining said workpiece primarily with a lower end portion of said electrode;
   (b) thereafter circularly moving said electrode relative to said workpiece in a direction perpendicular to the main machining direction while simultaneously (1) retracting said electrode upwardly from said predetermined depth in the main machining direction, and (2) increasing the radius of circular movement of said electrode in proportion to the retracting movement thereof while machining said workpiece primarily with side surfaces of said electrode, and
   (c) moving said electrode toward the center of the circulating locus of said electrode in response to a shortcircuit between the electrode and the workpiece to thereby establish a gap between said electrode and said workpiece.

2. The method as claimed in claim 1 in which said electrode is moved toward the center of the circulating locus of said electrode relative to said workpiece in response to the machining gap between said electrode and said workpiece falling below a predetermined reference.

3. The method as claimed in claim 2 wherein the peripheral radius is maintained substantially at zero for a predetermined period after the machining gap between said electrode and said workpiece is reestablished upon elimination of a shortcircuit to thereby prevent the hunting of said electrode.

4. The method as claimed in claim 1 in which the position of said electrode is detected by counting output pulses from a Z-scale sensor attached to said electrode.

5. The method as claimed in claim 1 in which the position of said electrode is detected by the combination of an interelectrode servo and a Z-axis position servo.

6. The method as claimed in claim 1 in which even if the machining gap is increased between said electrode and said workpiece, said electrode is not immediately retracted backwardly in a Z-axis direction until said workpiece is sufficiently machined.

7. The method as claimed in claim 1 in which said workpiece is machined by setting the radius at the finished position of the machining operation in the Z-axis direction, whereby a tapered shape of a predetermined width can be machined in said workpiece irrespective of the size of said electrode.

* * * * *